United States Patent [19]

Le Du et al.

[11] Patent Number: 4,565,635
[45] Date of Patent: Jan. 21, 1986

[54] FLOCCULATION OF AQUEOUS MEDIA WITH NOVEL FLOCCULATING ADJUVANT

[75] Inventors: Yannick Le Du, Maisons Alfort; Francois Meiller, Palaiseau, both of France

[73] Assignee: Rhone-Poulenc Specialites Chimiques, Courbevoie, France

[21] Appl. No.: 460,770

[22] Filed: Jan. 25, 1983

Related U.S. Application Data

[63] Continuation of Ser. No. 442,002, Nov. 16, 1982, abandoned.

[30] Foreign Application Priority Data

Nov. 16, 1981 [FR] France ................................ 81 21360

[51] Int. Cl.⁴ .............................................. C02F 1/54
[52] U.S. Cl. .................................. 210/727; 210/728; 210/730; 252/181; 435/830; 435/910; 435/911
[58] Field of Search ............... 210/725, 727, 728, 730, 210/732–734; 252/180, 181, 315.3, 363.5; 435/104, 170, 171, 830, 910, 911; 106/208, 209

[56] References Cited

U.S. PATENT DOCUMENTS

| | | | |
|---|---|---|---|
| 2,393,269 | 1/1946 | Rudolfs et al. | 210/728 |
| 3,276,998 | 10/1966 | Green | 210/728 |
| 3,300,406 | 1/1967 | Pollio | 210/666 |
| 3,338,828 | 8/1967 | Clark | 210/730 |
| 3,342,732 | 9/1967 | Goetz | 210/730 |
| 3,350,304 | 10/1967 | Bacon | 210/728 |
| 3,406,114 | 10/1968 | Goren | 210/730 |
| 3,657,182 | 4/1972 | Jolly | 524/156 |
| 3,681,283 | 8/1972 | Yueh | 210/730 |
| 3,859,210 | 1/1975 | Hatch | 210/666 |
| 4,353,803 | 10/1982 | Dover | 210/728 |
| 4,363,733 | 12/1982 | Meiller | 210/730 |
| 4,425,238 | 1/1984 | Degen et al. | 210/728 |

FOREIGN PATENT DOCUMENTS

| | | | |
|---|---|---|---|
| 79838 | 5/1983 | European Pat. Off. | 210/730 |
| 2543135 | 10/1976 | Fed. Rep. of Germany | 210/727 |
| 55-127109 | 10/1980 | Japan | 210/728 |
| 56-115605 | 9/1981 | Japan | 210/728 |

Primary Examiner—Peter Hruskoci
Attorney, Agent, or Firm—Burns, Doane, Swecker & Mathis

[57] ABSTRACT

Aqueous media, e.g., potable waters, are treated/purified by flocculation utilizing, as the flocculant therefor, that flocculating adjuvant adapted for ready dispersion/dissolution in such media comprising intimate admixture of a water soluble gum, polymer or biogum heteropolysaccharide, a dispersion/dissolution enhancing amount of a water donor material, and, advantageously, an anionic and/or nonionic surfactant.

33 Claims, No Drawings

FLOCCULATION OF AQUEOUS MEDIA WITH NOVEL FLOCCULATING ADJUVANT

This application is a continuation of our copending application, Ser. No. 442,002, filed Nov. 16, 1982, now abandoned Cf. our Chaux et al copending application Ser. No. 442,004 now abandoned, and Chaux et al copending application, Ser. No 442,003 now abandoned, both filed concurrently herewith and both assigned to the assignee hereof.

BACKGROUND OF THE INVENTION

1. Field of the Invention

The present invention relates to the purification of water, particularly potable waters, and, more especially, to water purification by flocculation, utilizing as the flocculant therefor, a certain composition of matter comprising a water soluble natural or synthetic gum or polymer, or a water soluble biogum.

2. Description of the Prior Art

It is known to this art to purify/treat various waters and sludges by flocculation, employing as the flocculating agent therefor certain metal salts, such as $CaCl_{12}$, $FeCl_2$, $FeCl_3$, $FeSO_4$ or $Fe_2(SO_4)_3$, or admixtures thereof, as described in French Pat. No. 1,399,351.

Aluminum sulfate is also frequently used. It too is known, however, that in flocculation two phenomena are typically superimposed upon one another: on the one hand, the neutralization of charges and, on the other, the agglomeration of neutralized particles in more or less large floccules. Aluminum sulfate and the different iron compounds typically give rise only to the first phenomenon and yield only small floccules, which are slowly decanted. The known flocculating additives, thus, do not always provide a precipitate with the properties required for effective and facile decantation.

And it is for this very reason that the natural gums are used individually, or in combination with inorganic salts (potato starch, alginates, dextrins, gelatin); also, certain water soluble, high molecular weight synthetic polymers/gums too may be employed as flocculating agents.

Said polymers/gums may be obtained either by complete chemical synthesis, such as, for example, the polyacrylic acids or the polyacrylamides, or by biosynthesis, such as, for example, Xanthan gum produced by the fermentation of a carbohydrate with bacteria of the genus Xanthomonas. As an illustration of the use of Xanthan gum in the purification of waters, compare published French application No. 78/36644.

The difficulty encountered in the employment of most of the aforesaid polymers/gums as flocculating adjuvants, however, is that they are difficult to solubilize, which flies in the face of their use as flocculating additives.

One of the major problems in the treatment/purification of waters further consists of the fact that the nature of the waters to be treated varies greatly from one location to another, and even in the same location from one day to the other, such that a solution that is effective for one type of water, cannot be used when conditions change.

Serious need thus exists in this art for a solution to the problem of the desirable use of gums as flocculating adjuvants, and to find a solution that is universally applicable, regardless of the nature of the waters to be treated/purified.

SUMMARY OF THE INVENTION

Accordingly, a major object of the present invention is the provision of an improved process for the generic treatment/purification of aqueous media, said improved process featuring flocculating such media with an adjuvant comprising a water soluble gum and a dispersion/-dissolution facilitating amount of an additive adapted to introduce a certain content of water thereto, or "water donor", or an additive adapted to itself sorb and retain water from the external aqueous environment being subjected to treatment/purification.

DETAILED DESCRIPTION OF THE INVENTION

More particularly according to this invention, by "water soluble gums" there are intended those gums and polymers to date used, as aforesaid, for the treatment/purification of waters and other aqueous media, and including the natural water soluble gums and polymers, the water soluble biogums and the synthetic water soluble polymers and gums.

In the description of the present invention which follows, the following definitions are employed:

(i) Gum: any polymer material that may be dissolved or dispersed in water to yield aqueous solutions or dispersions;

(ii) Natural gum: natural polymer gums of vegetable or animal origin;

(iii) Biogum or "heteropolysaccharide of microbial origin": linear exocellular polymer of high molecular weight, preferably in excess of one million, obtained by the fermentation of a carbohydrate by the action of bacteria of the genus Xanthomonas or Arthrobacter, or of fungi of the genus Sclerotium. More specifically, Xanthan gum is representative and is a polysaccharide produced by the fermentation of a carbohydrate with bacteria of the genus Xanthomonas;

(iv) Synthetic gum: any polymer gum produced entirely by chemical synthesis.

Also in the description which follows, the nature of the components of the flocculating adjuvant consistent herewith and primarily that of the water soluble gum/-polymer shall be fully characterized.

The water soluble gums include the natural gums.

The natural gums are materials widely described in the literature [R. L. Whistler, *Industrial Gums, Polysaccharides and Their Derivatives*, 2nd Edition, Academic Press (1973)].

Among the vegetable gums suitable for use in the adjuvants according to this invention, the following are representative:

(i) Seaweed gums: agar-agar, algins and alginates, carrageenin;

(ii) Vegetable exudate gums: gum arabic, gum tragacanth;

(iii) Vegetable seed grain gums: carob gum, guar gum;

(iv) Vegetable extract gums: pectin.

Agar-agar is extracted from red seaweed (Gelidium sp.) by means of boiling water. It is a linear galactan sulfate: an alternating copolymer of $\beta$-D-galactopyranose ($\beta 1 \rightarrow 4$ bond) and anhydro-3,6-$\alpha$L-galactopyranose ($\alpha 1 \rightarrow 3$ bond) bearing a small number of sulfate groups.

Algin is a polysaccharide found in brown seaweed (*Macrocystis pyrifera-Laminaria digitata*). The most common algin is sodium alginate which is a high molecular weight, linear polymer comprising recurring units of β-D-mannopyranosyluronic acid (1→4 bond) and α-L-gulopyranosyluronic acid (1→4 bond).

Carrageenins originate in red seaweed *(Chondrus crispus, Gigartina stellata)* and are mixtures of polysaccharides which may be fractioned into kappa-, lambda- and iota-carrageenates. Carrageenates contain the following predominant units: 4-sulfate-D-galactose (1→3 bond) and 3,6-anhydro-D-galactose (1→4 bond), for kappa-carrageenate; 2,6-disulfate-D-galactose (1→4 bond) and 2-sulfate-D-galactose (1→3 bond) for lambda-carrageenate; 4-sulfate-D-galactose (1→3 bond) and 2-sulfate-3,6-anhydro-D-galactose (1→4 bond) for iota-carrageenate.

Gum arabic is produced by trees belonging to the acacia family (Acacia sp.). It is a colloid having a branched structure still not completely elucidated. The principal chain consists of D-galactopyranose connected by β(1→6) and β(1→4) bonds; it bears side chains of D-galactopyranose, arabinose, rhamnose and glucuronic acid attached by means of 1→3 bonds. Its molecular weight ranges from 200,000 to 300,000.

Gum tragacanth, originating in Astragalus gummifer, is substance with a complex structure comprising two fractions: one consisting of galacturonic acid, arabinose and xylose, the other of polymethoxy acids. It has a high molecular weight (on the order of 840,000).

Carob gum originates in the seeds of *Ceratonia siliqua*. It is a galactomannane with a molecular weight of approximately 310,000, consisting essentially of a straight polymer of D-mannose (1→4 bond) with side chains each consisting of a galactose residue on each of the four or five mannose groups attached by 1→6 bonds.

Guar gum is derived from *Cyamopsis tetragonolobus* of the legume family. Its average molecular weight ranges from 200,000 to 300,000. Its structure is similar to carob gum and differs only in that the number of lateral G-galactose chains is greater.

Pectin is found mainly in cell walls and the intercellular spaces of vegetable tissues. The commercial source of pectin is cedrat-albedo wastes. Pectin may be considered a linear polymer of galacturonic acid, with a greater or lesser amount of the carboxyl groups thereof being esterified by methyl radicals. Pectins are classified as a function of their content in methoxy-O-$CH_3$ groups. Thus, pectins are distinguished as being of high (H.M.) methoxy group type (70% or more of the carboxyl groups esterified) or as pectins of low (L.M.) methoxy group type (less than 50% of the carboxyl groups are esterified). The molecular weight of the pectins varies widely from 1,000 to 100,000 and varies as a function of the length of the chain, which may contain from several units to several hundred units of galacturonic acid.

As regards the gums of animal origin, gelatin is representative. For a more complete description of these gums, reference is made to Martin Glicksman, *Gum Technology in the Food Industry*, page 359, Academic Press (1969).

From among the aforesaid gums, the natural gums are the preferred and more preferred are alginates, gum tragacanth, pectin, and gelatin.

The water soluble gums according to the invention also include the biogums, as aforedefined. The biogums are produced by the fermentation of a carbohydrate by the action of bacteria of the genus Xanthomonas or Arthrobacter, or of fungi of the genus Sclerotium.

Representative species of the bacteria or fungi that may be used for the production of these biogum heteropolysaccharides are, for example: *Xanthomonas begoniae, Xanthomonas campestris, Xanthomonas carotea, Xanthomonas hederae, Xanthomonas incanae, Xanthomonas malvacearum, Xanthamonas papavericola, Xanthomonas phaseoli, Xanthomonas pisi, Xanthomonas vasculorum, Xanthomonas vesicatoria, Xanthomonas vitians, Xanthomonas pelargonii, Arthrobacter stabilis, Arthrobacter viscosus, Sclerotium glucanicum, Sclerotium rolfsii,* and the like.

The species particularly suitable for the aforesaid type of fermentation are *Xanthomonas begoniae, Xanthomonas campestris, Xanthomonas incanae* and *Xanthomonas pisi.*

The species *Xanthomonas campestris* is especially suitable for the production of the subject biogums.

And it is of course possible to ferment a very wide variety of carbohydrates with the microorganisms belonging to the aforenoted genera in order to produce the heteropolysac-charide biogums useful in the adjuvants of the invention. Exemplary carbohydrates that may be employed include glucose, sucrose, fructose, maltose, lactose, soluble starch, corn starch, potato starch, or the like. The fermentation of the carbohydrate is typically effected in an aqueous medium, utilizing any one of a number of known processes, for example, those described in U.S. Pat. Nos. 3,000,790, 3,271,267, 3,391,060, and 3,555,447, and in French application No. 78/01572, published under No. 2,414,555.

It too may be advantageous, prior to use, to subject the fermented mash to heating at a temperature ranging from 80° to 130° C. for from approximately 10 min to approximately one hour.

The heteropolysaccharide is separated from the fermenting mash and is used in the powder form. The separation of the heteropolysaccharide from the mash, possibly preheated as above-indicated, may be effected by conventional methods, for example, by precipitating it by addition to said mash of a lower alcohol, such as methanol, ethanol, isopropanol, tertiary butanol or acetone, or a mixture of such precipitating agents. Once precipitated, the heteropolysaccharide is separated, washed with the liquid of precipitation, and then dried and ground.

The heteropolysaccharide may also be subjected to subsequent purification operations; for this purpose, the known methods of the prior art may be used. Same consist, for example, of exposing the fermented mash, or the aqueous gel reconstituted from the heteropolysaccharide extracted from the mash, to centrifuging or filtration using diatomaceous earth, to the action of enzymes of protease type (French Pat. No. 2,264,077), or to sodium hydroxide (U.S. Pat. No. 3,729,460).

Preferably, that Xanthan gum produced by the fermentation of a carbohydrate with a pure culture of *Xanthomonas campestris*, is used consistent herewith; said biogum being extracted with isopropanol, and then dried and ground.

Xanthan gum is a heteropolysaccharide having a molecular weight in excess of $10^6$. It contains D-glucose, D-mannose and D-glucuronate in the molar ratios of 2.8/2.0/2.0. It is partially acetylated with approximately 4.7% of acetyl radicals. It additionally contains approximately 3% of pyruvate radicals attached to a single lateral chain of the D-glucopyranosyl matrix as a ketal.

Finally, the water soluble synthetic gums/polymers may be utilized in the adjuvants according to this invention. The acrylic polymers and copolymers, and derivatives thereof, are exemplary of this category.

More particularly, the following polymers and derivatives thereof are representative: polyacrylic and polymethacrylic acids, the salts and esters thereof, and the polyacrylamides and polymethacrylamides.

All of the foregoing water soluble synthetic gums/polymers are known, commercial products. Compare, for example, Kirk-Othmar, *Encyclopedia of Chemical Technology*. Representative preparations of such polymers are set forth below, without intending the invention to be limited to the particular polymers prepared by the particular exemplary processes described.

Acrylic acids and derivatives thereof may be polymerized in mass, in aqueous or organic solution, in emulsion or in an aqueous dispersion. In any case, the polymerization is effected by means of a polymerization initiator, which may be an anionic or organometallic initiator, or a free radical initiator produced by heat treatment, by a redox system, or by the effects of radiation.

The polymerization of acrylic or methacrylic acid in solution may be conducted in water by heating the monomer in the presence of initiators, such as hydrogen peroxide, potassium persulfate, acetyl peroxide or by polymerizing the monomer at a lower temperature between 50° and 100° C., while initiating the reaction with a potassium persulfate and sodium thiosulfate redox system.

A similar polymerization in aqueous solution may be conducted by irradiating the aqueous solution with ultraviolet radiation.

It is also possible to carry out the polymerization in organic solvents, such as methanol, dioxane in the presence of azobisisobutyronitrile and at a higher temperature, or in solvents such as benzene, n-hexane, with benzoyl peroxide as the initiator, at elevated temperatures, to produce an insoluble polymer which is separated from the reaction medium by filtration.

Salts of acrylic and methacrylic acid may be polymerized in an aqueous medium in the presence of initiators, but most often the salts of polyacrylic acids and of the homologs thereof are prepared by neutralizing the corresponding polymer with an organic or inorganic base.

A homopolymer may also be prepared from aminoalkyl acrylates and methacrylates, optionally quaternized. Generally, same are employed in the form of their chlorides and polymerized in aqueous solution under the same conditions as for acrylic acid.

Acrylamide polymers may also be used; same include a large class of monomers; acrylamide, methacrylamide and all of the N-substituted derivatives thereof.

Acrylamide polymerizes in aqueous solution with free radical initiators, such as t-butyl hydroperoxide, hydrogen peroxide, alkali metal or ammonium persulfates, chlorates, perborates, percarbonates, and the like. Redox systems of ammonium persulfate and potassium metabisulfate type are used to polymerize at low temperatures and to obtain high molecular weights. Industrially, polymerization is conducted in a solution with 30–60% of the monomer, at a temperature of 30°–60° C., by using a catalyst representing 0.01 to 10% by weight of the monomer, at a pH between 3 to 6. Polymerization takes 3 to 6 hours. The polymer is converted to a powder by conventional methods: atomization or precipitation with lower alcohols.

It too is possible to polymerize acrylamide by using other initiators, e.g., azo compounds, photochemical systems, X-rays, ultraviolet rays, etc.

In addition to the foregoing homopolymers, it is also envisaged to employ soluble copolymers prepared by copolymerization of hydrophilic monomers. For example, representative copolymerizations include those with the comonomers acrylamide, methacrylamide, acrylic and methacrylic acids, the salts and esters thereof, and the aminoalkyl acrylates and methacrylates, optionally quaternized, and the like.

The polymers or copolymers which may be employed in the compositions of the invention thus may be highly diverse in nature, just so long as they are soluble in an aqueous medium and are useful as flocculating adjuvants in the treatment/purification of aqueous media.

Particularly suitable for use in the invention are the polymers or copolymers of acrylic compounds, such as acrylamide, methacrylamide, acrylic acids and the salts or esters thereof, aminoalkyl acrylates and methacrylates, optionally quaternized, and which are prepared by the process described in French Pat. No. 2,348,227 which comprises:

(i) continuously depositing, in a thin layer, onto a support, an aqueous solution of an acrylic monomer containing a photopolymerization promoter, in particular benzoin and its methyl, ethyl, or isopropyl esters, in a proportion of 0.005 to 1% by weight with respect to the monomer, preferably 0.01 to 0.5%, by weight, said solution containing less than 1 mg oxygen per liter of solution, preferably less than 0.5 mg/l;

(ii) exposing the thin, liquid layer to irradiation having wave lengths between 300 and 450 m$\mu$, preferably 330 and 400 m$\mu$, for a period from 1 to 20 min, preferably 3 to 7 min, the average energy of active radiation being between 20 and 300 watts/m$^2$, with the gaseous atmosphere enveloping the solution exposed to photopolymerization having an oxygen content of less than 5% by volume, preferably less than 0.5%, the support being cooled to dissipate the heat generated by the polymerization;

(iii) maintaining the thin layer subjected to the initial photopolymerization in the aforesaid step (ii) on said cooled support and under the oxygen-free atmosphere, and then exposing it to a second irradiation with wave lengths of 300 and 450 m$\mu$ for a period from 1 to 20 min, preferably 3 to 10 min, the average energy of this second irradiation being greater than 300 and less than 2,000 watts/m$^2$; and (iv) removing the thin solid layer obtained in this manner from the support and exposing same in air to irradiation with wave lengths between 300 and 450 m$\mu$, preferably 330 and 400 m$\mu$, for 30 min to 3 hours, preferably 40 min to 90 min, with the average energy of active radiation being 20 to 500 watts/m$^2$.

The water donor component of the subject adjuvants, or material providing the required fraction of water, is comprised of either bound water, or sorbed water, or water of crystallization. The first category of materials includes hydrated silica and alumina, either alone or in admixture, in a natural or synthetic form.

Thus, finely precipitated silica, in the form of fine particles having a large surface area, may be used. More particularly, silica particles having a BET surface ranging from 200 to 400 m$^2$/g are employed, [the BET surface is determined by the method of Brunauer-Emmett-Teller, described in *Journal of the American Chemical*

Society, 60, page 309 (Feb. 1938)]. The ultimate particle size of the silica varies from 200 to 800 Å.

Further, hydrated silica gels are also suitable for use in the invention, in particular the following three principal types of gels: gels having a BET surface of 750–800 m$^2$/g, a pore volume of 0.37–0.40 cm$^3$/g, and an average particle diameter of 22–26 Å; gels having a BET surface of 300–350 m$^2$/g, a pore volume of 0.9–1.1 cm$^3$/g, and an average particle diameter of 120–160 Å; and gels having a BET surface of 100–200 m$^2$/g, a pore volume of 1.4–2.0 cm$^3$/g, and an average particle diameter of 180–220 Å.

Also useful consistent herewith are the dehydrated silica gels having a BET surface of 10 to 500 m$^2$/g and a pore volume of 0.5 to 1.1 cm$^3$/g, with an average pore diameter ranging from 30 to 3,000 Å, preferably 600 to 3,000 Å. An autoclave treatment, described in French Pat. No. 2,093,176, enables providing the silica with the surface desired.

The water donor may also be an alumina hydrate in either of two states of hydration: $Al_2O_3.3H_2O$ and $Al_2O_3.H_2O$. Same may be employed in their natural form: hydrargillite or gibbsite, bayerite, nordstrandite, boehmite, diaspore; or in their synthetic form. Dried alumina gels of the boehmite type, having a surface of 200 to 400 m$^2$/g and pore diameters of 50 to 100 Å, or various commercial products, in particular the α-trihydrate obtained via the Bayer process and having spheroidal particles with dimensions of 20 to 150 microns, too may be used.

All of the aforesaid compounds are products per se known to the art and are described, for example, in the Kirk-Othmar encyclopedia, *Encyclopedia Of Chemical Technology*, Volume 2.

Also useful are the hydrated silica aluminates in the form of argillas, or natural or synthetic zeolites.

Exemplary of the argillas suitable for use according to this invention, those belonging to the following groups are representative:

(i) Kaolin type: kaolinite, dickite, nakrite, anauxite, halloysite, endelitte;

(ii) Serpentine type: chrysolite, amesite, cronstedite, chamosite, garnierite;

(iii) Montmorillonite type: montmorillonite (bentonite), beidellite, nontronite, hectorite, saponite, sauconite;

(iv) Vermiculite or chlorite type; and (v) Attapulgite or sepiolite.

Representative natural zeolites are analcime, harmotome, phillipsite, gismondine, laumontite, erionite, offretite, levynite, faujasite, chabazite, gmelinite, natrolite, scolecite, mesolite, thomsonite, edingtonite, mordenite, ferrierite, epistilbite, heulandite, clinoptilolite, stilbite, brewsterite. Preferably, faujasite or mordenite is utilized.

Exemplary of the synthetic zeolites, the following commercial zeolites are representative: zeolites of type A, X, Y, L and those reproducing the structure of mordenite, chabazite and erionite.

The zeolites X and Y typically have a BET surface of 800 m$^2$/g and a pore volume, respectively, of 0.36 cm$^3$/g and 0.34 cm$^3$/g.

The zeolites of type A, particularly of type 4A, have a BET surface of less than 10 m$^2$/g and a pore volume of 0.30 cm$^3$/g For a detailed description of hydrated silica aluminates, reference is made to the literature: for example, for the argillas, to Kirk-Othmar, *Encyclopedia Of Chemical Technology*, Volume 5, and for the natural and synthetic zeolites, to D. W. Breck, *Zeolite Molecular Sieves*, A. Wiley-Interscience Publications (1974).

Also intended as water donors or materials incorporating water into the subject compositions are the hydrates of various inorganic or organic metal salts, in particular the alkali or alkaline earth metal salts.

More specifically, hydrates of the following salts or compounds, used either alone or in admixture or combination, may be used: carbonates, halides, nitrates, phosphates, silicates, sulfates, as well as the acetates, citrates, lactates laurates and tartrates of sodium, potassium, calcium, magnesium, and the like.

As specific examples of the foregoing, the following are representative:

(1) Sodium acetate trihydrate: $NaC_2H_3O_2.3H_2O$ (2) Sodium carbonate heptahydrate: $Na_2CO_3.7H_2O$ (3) Sodium carbonate decahydrate: $Na_2CO_3.10H_2O$ (4) Sodium citrate pentahydrate: $Na_3C_6H_5O_7.5.5H_2O$ (5) Sodium orthophosphate dodecahydrate: $Na_3PO_4.12H_2O$ (6) Magnesium and sodium tartrate decahydrate: $Na_2Mg(C_4H_4O_6)_2.10H_2O$ (7) Sodium sulfate heptahydrate: $Na_2SO_4.7H_2O$ (8) Sodium sulfate decahydrate: $Na_2SO_4.10H_2O$ (9) Potassium and magnesium chloride hexahydrate: $KCl.MgCl_2.6H_2O$

(10) Potassium and magnesium sulfate hexahydrate:

(11) $K_2SO_4.MgSO_4.6H_2O$

(12) Calcium acetate dihydrate: $Ca(C_2H_3O_2)_2.2H_2O$

(13) Calcium carbonate hexahydrate: $CaCO_3.6H_2O$

(14) Calcium chloride hexahydrate: $CaCl_2.6H_2O$

(15) Calcium citrate tetrahydrate: $Ca_3(C_6H_5O_7)_2.4H_2O$

(16) Calcium lactate pentahydrate: $Ca(C_3H_5O_3)_2.5H_2O$

(17) Calcium nitrate trihydrate: $Ca(NO_3)_2.3H_2O$

(18) Calcium nitrate tetrahydrate: $Ca(NO_3)_2.4H_2O$

(19) Calcium sulfate dihydrate: $CaSO_4.2H_2O$

(20) Calcium tartrate tetrahydrate: $CaC_4H_4O_6.4H_2O$

(21) Magnesium acetate tetrahydrate $Mg(C_2H_3O_3)_2.4H_2O$

(22) Magnesium chloride hexahydrate: $MgCl_2.6H_2O$

(23) Magnesium carbonate pentahydrate: $MgCO_3.5H_2O$

(24) Magnesium lactate trihydrate: $Mg(C_3H_5O_3)_2.3H_2O$

(25) Magnesium nitrate hexahydrate: $Mg(NO_3)_2.6H_2O$

(26) Magnesium orthophosphate octahydrate: $Mg_3(PO_4)_2.8H_2O$

(27) Magnesium sulfate heptahydrate: $MgSO_4.7H_2O$

(28) Magnesium tartrate pentahydrate: $MgC_4H_4O_6.5H_2O$

From among all of those water donors above outlined, finely divided silicas, capable of adsorbing 2 to 3 times their weight in water, are preferably selected.

It has also been determined that typically for the best results to be obtained consistent herewith, a third additive is included, such as a surfactant of the anionic and-/or nonionic type.

A preferred embodiment of this invention is thus defined by an adjuvant composition of matter comprising a water soluble gum/polymer having enhanced properties of dissolution, the same including, in addition to the water soluble gum or polymer, a material incorporating water into the composition, or water donor, or material adapted to sorb and retain water, and an anionic and/or nonionic surfactant.

It too has now surprisingly been found that the compositions of the invention improve the dissolution of the water soluble gum or polymer to a degree increasing with the original degree of difficulty of dissolution of the gum or polymer.

For a description of the surfactants intended hereby, reference is made, for example, to Kirk-Othmar, *Encyclopedia Of Chemical Technology*, Volume 19, or to the different volumes in the series, *Surfactant Sciences Series* Marcel Dekker, Inc.; Vol. 1: *Nonionic Surfactants*, by Martin J. Schick; Vol. 7: *Anionic Surfactants*, by Warner M. Linfield; or the work by McCutcheons: *Detergents and Emulsifiers*, International and North American Edition.

As examples of the anionic surface active agents that may be used, the following are representative:

(i) soaps of alkali metals, such as the sodium or potassium salts of saturated or unsaturated fatty acids having 8 to 24 carbon atoms, preferably having 14 to 20 carbons, or aminocarboxylic acid derivatives, such as sodium N-lauryl sarconisate, sodium N-acylsarconisate, and the like;

(ii) alkali sulfonates such as the alkyl sulfonates, aryl sulfonates or alkylaryl sulfonates; in particular alkyl sulfonates, such as, for example, the diesters of sulfosuccinic acid, such as sodium diethylhexylsulfosuccinate, sodium dioctylsulfosuccinate, alkylbenzenesulfonates of the formula $R_1\text{-}C_6H_4SO_3M_1$ wherein the radical $R_1$ is a linear or branched chain alkyl radical containing 8 to 13 carbon atoms, such as, for example, a nonyl, dodecyl or tridecyl radical and $M_1$ represents a sodium atom, a potassium atom, an ammonium radical, diethanolamine or triethanolamine; alkylnaphthalenesulfonates of the formula $(R)_{\overline{n_0}}C_{10}H_{7-n_0}SO_3M_1$ wherein $n_0$ is a number ranging from 1 to 3 and the radical R is a linear or branched chain alkyl radical containing 1 to 4 carbon atoms, such as, for example, a methyl, isopropyl or isobutyl radical and $M_1$ is as above-defined; other sulfonates may also be employed, such as N-acyl, N-alkyltaurates of the formula $R_2\text{-}CO\text{-}N(R_2')\text{-}CH_1\text{-}CH_2\text{-}SO_3Na$ wherein $R_2$ is an alkyl radical having 11 to 18 carbon atoms and $R_2'$ is a methyl or ethyl radical, such as, for example, sodium N-oleoyl-N-methyltaurate or N-palmitoyl-N-methyltaurate; olefin sulfonates resulting from the sulfonation of the linear olefin fractions, $C_{14}$ to $C_{18}$;

(iii) sulfates and sulfate products: among the alkyl sulfates having the formula $R_3OSO_3M_1$, representative are those wherein the $R_3$ radical is a lauryl, cetyl or myristyl radical and $M_1$ is as above-defined; natural sulfate oils and fats; the disodium salt of sulfated oleic acid; polyoxyethylene sulfate fatty alcohols of the formula $R_4(O\text{-}CH_2\text{-}CH_2)_{\overline{n_1}}OSO_3M_1$ wherein $R_4$ is an alkyl radical containing 6 to 16 carbon atoms, such as, for example, a myristyl radical or a linear or branched chain alkyl radical, such as, for example, a hexyl, octyl, decyl or dodecyl radical, $n_1$ is the number of mols of ethylene oxide and varies from 1 to 4 and $M_1$ is as above-defined; polyoxyethylene alkylphenol sulfates having the formula $R_5\text{-}C_6H_4(O\text{-}CH_2\text{-}CH_2)_{\overline{n_2}}OSO_3M_1$, wherein $R_5$ is a linear or branched chain alkyl radical containing 8 to 13 carbon atoms, such as, for example, an octyl, nonyl or dodecyl radical, $n_2$ is the number of mols of ethylene oxide and varies from 1 to 6 and $M_1$ is as above-defined;

(iv) alkaline phosphates: the mono- and diesters of orthophosphoric acid or one of its salts which may be represented, for the alkyl phosphates, by the formula $(R_6O)PO(OM_2)_2$ and, for the dialkyl phosphates, by the formula $(R_6O)_2PO(OM_2)$ wherein $R_6$ is a linear or branched chain alkyl radical having 6 to 12 carbon atoms and $M_2$ represents a hydrogen atom, or a sodium or potassium atom; as an example of the radical $R_6$, n-hexyl, n-octyl, n-ethylhexyl, dimethylhexyl, n-decyl, dimethyloctyl, trimethylheptyl and trimethylnonyl are noted; the mono- or diesters of orthophosphoric acid, or salt thereof, polyoxyethyleneated, which may be represented, for the polyoxyethylene alkyl phosphates, by the formula:

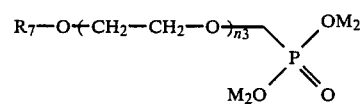

and, for the dialkyl polyoxyethylene phosphates, by the formula:

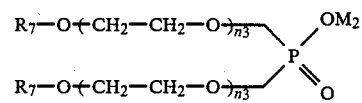

wherein $R_7$ represents a linear or branched chain alkyl radical having 6 to 12 carbon atoms, a phenyl radical, an alkylphenyl radical with the alkyl chain having from 8 to 12 carbon atoms, $n_3$ is the number of mols of ethylene oxide and varies from 2 to 8, and $M_2$ is as above-defined; as examples of the radical $R_7$, hexyl, octyl, decyl, dodecyl and nonylphenyl are representative.

Exemplary nonionic surfactants are the compounds obtained by condensation of an alkylene oxide with an organic compound, which may be aliphatic or alkylaromatic. Representative nonionic surfactants are:

(i) polyoxyethylene alkylphenols, for example, the products of the condensation of 5 to 25 mols of ethylene oxide per mol of alkylphenol, the alkyl radical of which being straight or branched chain and containing from 6 to 12 carbon atoms; in particular, nonylphenol condensed with approximately 10 to 30 mols of ethylene oxide per mol of phenol, dinonyl phenol condensed with 15 mols of ethylene oxide per mol of phenol and dodecylphenol condensed with 12 mols of ethylene oxide per mol of phenol, are representative;

(ii) aliphatic polyoxyethylene alcohols resulting from the condensation of 5 to 30 mols of ethylene oxide with linear or branched chain fatty alcohols containing from 8 to 22 carbon atoms: for example, the product of condensation of approximately 15 mols of ethylene oxide with 1 mol of tridecanol or coprah alcohol; myristyl alcohol condensed with 10 mols of ethylene oxide;

(iii) fatty amides, such as, for example, the diethanolamide of fatty acids, or polyoxyethyleneated fatty acids, such as lauric acid or coconut oil;

(iv) polyoxyethylene and polyoxypropylene derivatives; illustrative of this type of surfactant are the well known products marketed under the trademark "PLURONICS". Same are obtained by the sequential addition of propylene oxide and ethylene oxide to a reactive hydrogen compound with a low molecular weight, such as, for example, propylene glycol.

In order to facilely incorporate the surfactant into the compositions of the invention, it is introduced in a solid, preferably powder form.

The surfactants are in the solid and, more frequently, in the liquid state. In the case of a liquid surfactant, it must first be deposited onto a powder support capable of sorbing and desorbing the liquid and which is chemically inert, insoluble or soluble. It may also be sorbed directly onto the powder consisting of the water donor, with water optionally being added thereto.

Preferably, a solid surfactant such as sodium alkylpropylnaphthalene sulfonate, in particular sodium diisopropylnaphthalene sulfonate, is utilized.

It will of course be appreciated that appropriate surfactant will be selected in conformity with the various environmental regulations governing the treatment of water.

Also for description of the various flocculating adjuvant compositions to be utilized consistent herewith, compare those Chaux et al copending applications noted above.

The proportions of the various, advantageously three components in the subject adjuvant compositions, are preferably as follows:

The amount of water in the adjuvant compositions according to the invention, expressed as the ratio by weight of gum/water, may vary over wide limits, from 6.5 to 1, preferably 2.5 to 1.

The lower limit is not critical. However, it is preferred that this ratio does not exceed 4.

The amount of water donor is defined as the ratio by weight of the water donor to water; it preferably ranges from 0.3 to 0.6, while it nonetheless may be selected within a larger range, from 0.3 to 2.6.

The amount of the surfactant employed, defined as the ratio of the weight of the surfactant to the total weight of the adjuvant composition of the invention, may vary from 0 to 0.10. The upper limit is not critical, but there is no advantage in attaining weight ratios higher than 0.25. Preferably, the amount of surfactant is selected such that said ratio ranges from 0 to 0.07.

Examples of the subject adjuvant compositions comprised of a water soluble gum or polymer are as follows:
 (1) 30 to 70% by weight water soluble gum/polymer;
 (2) 7 to 40% by weight of water donor;
 (3) 0 to 10% by weight of an anionic and/or a nonionic surfactant; and
 (4) 15 to 37% by weight of water.

Preferred adjuvant compositions are the following:
 (1) 50 to 60% by weight water soluble gum/polymer;
 (2) 8 to 15% by weight of water donor;
 (3) 0 to 7% by weight of an anionic and/or nonionic surfactant; and
 (4) 24 to 36% by weight of water.

Concerning the preparation of the adjuvant compositions according to the invention, it varies slightly depending on whether or not the water component of any given composition is externally added or comprises water of crystallization, and depending on whether or not the surfactant is in the solid or liquid form.

The process for the preparation of the adjuvant compositions according to the invention comprises mixing, in the dry state, the water donor, onto which water may be adsorbed, with the gum or polymer and optically adding thereto the anionic and/or nonionic surfactant.

The first operation, which features the impregnation of the water donor with water, entails the following materials: finely divided silica, dehydrated silica gels, alumina hydrates and silica aluminate hydrates. Progressively, under agitation, water is added to the water donor. This stage is omitted, if, as the water donor, hydrated silica gels or the hydrates of inorganic or organic salts are employed.

The water donor is in the form of a dry powder, even if it is impregnated with water, as aforesaid.

Subsequently, its admixture with the water soluble gum or polymer is effected in a powder mixer of known type: free-falling, drum type mixer, vertical or horizontal screw mixers, horizontal Lodige type mixer, or the like.

The introduction of the surfactant, if it is a solid, is effected into the mixture of the water donor and the gum/polymer.

If the surfactant is present in the form of a liquid, it is generally adsorbed onto the water donor, simultaneously with or successively to the adsorption of water, whereupon it is admixed with the gum/polymer.

After all of the components are introduced, the mixing is continued. The duration of the operation is a function of the apparatus used and is easily determined by those skilled in the art, such that a homogeneous mixture is obtained.

The process of the invention provides adjuvant compositions in the form of a powder having excellent storage stability.

The compositions formulated as above are all useful as adjuvants in the flocculation process described hereinafter.

An additional object of the invention is thus a novel flocculation process, specifically for the purification of waters, characterized in that the water is treated at a pH ranging from 6 to 9 with a flocculating agent based upon a metal of the iron and/or aluminum group, and then adding thereto the flocculating adjuvant comprising a composition as above-described.

The flocculating agent may comprise a conventional flocculating agent, based in particular upon iron and/or aluminum, such as aluminum sulfate, chloride, hydrochloride, ferric chloride or chlorosulfate.

The treatment/purification of aqueous media by flocculation technique according to the invention is carried out as follows:

Thus, it has been found that it is necessary to first introduce into the water to be treated, the "conventional" flocculating agent, and thereafter the flocculating adjuvant comprising the water soluble gum/polymer.

Preferably, the addition of the gum adjuvant is effected within a variable period, for example, 1 to 5 minutes after the addition of the flocculating agent.

It also has been determined that the contact between the water to be treated and the flocculating agent must be rapid. For this reason, it is preferable to maintain the water to be treated under strong agitation, by means of those devices conventionally used in this field, such as, for example, a turbine agitator [Perry & Chilton, *Chemical Engineering Handbook*, 5th edition, (1973)].

The addition of the flocculating adjuvant is then serially carried out, also under strong agitation, for but a short period of time. Generally, 1 to 2 minutes suffice.

Subsequently, the medium is maintained under slow agitation, for example, for 15 to 30 minutes, and then the agitation is discontinued to permit decantation. Without thereby limiting the invention, the velocities of agitation employed are as given in the examples.

The flocculating agents and the flocculation adjuvants may be employed in the form of a powder, but it is preferable to add them in the form of a solution.

For aluminum based flocculating agents, typically hydrated aluminum sulfate solutions are utilized in a proportion of 630 g/liter, corresponding to 8% aluminum oxide, $Al_2O_3$, in an amount of approximately 5 to 150 cm$^3$ per m$^3$ of water treated; representative are 700 g/l solutions of aluminum chloride, corresponding to 15% aluminum oxide, $Al_2O_3$, in an amount of about 10 to 100 cm$^3$ per m$^3$ of water treated.

And for iron based flocculating agents, advantageously employed are 600 g/l solutions of ferric chloride, or 685 g/l solutions of ferric chlorosulfate, corresponding to 200 g/l of the iron, in an amount of 15 to 60 cm$^3$ of water treated.

The aforesaid specific values are exemplary only and other values will be readily apparent to the skilled artisan as a function of numerous parameters, particularly of the nature of the water and its temperature, the flocculating agent and its concentration in the solution.

Concerning the flocculating adjuvant, it is advantageously employed in solutions comprising 1 to 5 g/l. The solutions are prepared simply by adding the flocculating adjuvant to the aqueous medium under agitation, using conventional means of agitation (anchor, screw or turbine agitation, and the like).

In the flocculation process of the invention a quantity of the adjuvant is added such that there results 0.05 to 1 g of the water soluble gum or polymer per cubic meter of the water to be treated.

As mentioned hereinabove, the process according to the invention is suitable for the treatment of waters, and particularly for the treatment of potable waters requiring a higher degree of purity.

In order to further illustrate the present invention and the advantages thereof, the following specific examples are given, it being understood that same are intended only as illustrative and in nowise limitative.

As preliminary information, the following are set forth:

(1) The characteristics of the waters to be treated that must be determined;

(2) The characteristics of the flocculating agent;

(3) The characteristics and the preparation of the flocculating adjuvant; and (4) The conditions for carrying out the process of flocculation, which remain the same in each example.

(1) Characteristics of the waters to be treated:

The following characteristics of the crude water to be treated/purified are set forth:

(i) Temperature (ii) NTU turbidity: the turbidity of the water is the inverse of its transparency. It was determined by the method described in the text by J. Rodier, p. 65. It is expressed in Formazine units.

(2) Characteristics of the flocculating agents:

In the examples, solutions of aluminum sulfate marketed by Societe Rhone-Poulenc and that ferric chlorosulfate designated Clairtan, were used.

(a) Aluminum sulfate: the solution used contained 8.3% $Al_2O_3$. Its density was 1.32–1.33;

(b) Ferric chlorosulfate, $FeSO_4Cl$: Clairtan was an aqueous solution of ferric chlorosulfate of a deep brownish-red color. Its composition was the following:
Fe: 200 g/l (or 13%)
$SO_4^{--}$: 360 g/l (or 23.4%)
$Cl^-$: 120 g/l (or 7.8%)

Its density was 1.54 at 20° C.

(3) Characteristics and preparation of the flocculating adjuvants:

The following compounds were selected:

(a) As the water soluble gum/polymer:

(i) Sodium alginate: a product marketed under the trademark of Aqualgine, it is a purified sodium alginate extracted from seaweed of the genus Laminaria;

(ii) Gum tragacanth: a product marketed by Societe Iranex;

(iii) Pectins of the (L.M.) type, marketed by Unipectine under the reference 325 NH 95 and having an esterification percentage of 26 to 36%;

(iv) Gelatin of Societe Prolabo, No. 24350262;

(v) Xanthan gum marketed by Societe Rhone-Poulenc under the commercial designation of Rhodopol 23, having the following specifications:

| | | |
|---|---|---|
| (1) Appearance | | cream colored powder |
| (2) Apparent density g/cm$^3$ | | 0.8 |
| (3) Active ingredient | | 90% |
| (4) Ash content | | 10% |
| (5) Moisture content | | 10% |
| (6) pH (1% salt in distilled water) | | 7 |
| (7) Brookfield LVT viscosity 30 M, needle No. 4 | | 2,200–3,000 cps |
| (8) Particle size: | | |
| particles | | $<75\mu$ $<30\%$ |
| | | $>297\mu$ $<2\%$ |

(vi) Homopolymer of ethyltrimethylammonium methacrylate chloride (Flogocil C 4) designated polymer C: a strongly cationic polymer in the form of a fine white powder prepared by the process described in the French Pat. No. 2,348,227; and (vii) Acrylic acid and acrylamide copolymer (Flocogil AD 37) designated polymer A: moderately anionic polymer with a high molecular weight, $6-8.10^6$, and in the form of a fine, white powder obtained by the process described in the aforecited patent.

(b) As the water donor:

(i) A fine precipitated silica (Tixosil 38A) with a BET surface of 250 m$^2$/g and a pore volume of pores varying between 400 Å and 2.5$\mu$ of 1.80 cm$^3$/g of silica and a moisture content at 105° C. of less than 7%;

(ii) The following hydrates of inorganic or organic salts:

(1) Sodium sulfate decahydrate: $Na_2SO_4.10H_2O$ (2) Sodium acetate trihydrate: $NaC_2H_3O_2.3H_2O$ (3) Calcium lactate pentahydrate: $Ca(C_3H_5O_3)_2.5H_2O$ (c) As the surfactant:

An anionic surfactant was used in the solid form, Supragil WP, which is sodium diisopropylnaphthalene sulfonate. More precisely, it has the formula $(C_3H_7)_{\overline{no}}C_{10}H_{7-no}SO_3Na$ with no=1.8. It was selected for reasons of convenience of application, but a surfactant of food quality would be selected for the treatment of potable waters.

In each example, the amount of each component of the composition employed as the flocculating adjuvant is set forth.

The procedure employed for the formulation of the subject adjuvant compositions was as follows:

(i) Water was sorbed, if necessary, onto the water donor, in the amount selected. For this purpose, the water was slowly poured under mild agitation into a beaker containing said water donor;

(ii) The water soluble gum or polymer was then added to the water impregnated water donor, and same were then intimately admixed;

(iii) Finally, the solid surfactant was added thereto; and (iv) The resulting composition was homogenized for one hour in a powder mixer.

It will be appreciated that the impregnation stage is omitted, if, as the water donor, the hydrates of inorganic or inorganic salts are employed.

The conditions for the preparation of the solutions were as follows; in each experiment, 100 g of solution were prepared:

(i) Into a beaker equipped with a frame-type agitator rotating at a velocity of 100 rpm, 100 g of water were introduced; said water being city or tap water having a hardness of 25° HT (100 mg/l $Ca^{++}$ ions);

(ii) The powdered adjuvant composition was rapidly poured therein in the desired amount, with the extent of the addition being less than 30 sec; and (iii) The agitation was maintained until a constant viscosity resulted.

(4) Experimental conditions:

The flocculating adjuvant prepared as above was employed together with the flocculating agent in a series of experiments conducted in the following manner. The comparative experiments were carried out in an identical manner.

The experiments were carried out in Jar-Test according to the method described in: Technical Memo - Water 1972 (Degremont, p. 932).

The water to be treated is described in each experiment.

The flocculating agents were added under rapid agitation (120 rpm), maintained for 1 minute, then for another minute with the addition of the flocculating adjuvants; the agitation was then reduced to 40 rpm for 20 minutes.

During flocculation, the size of the resultant floccules was classified according to the following classification (Degremont):

(i) 0, no floccules;
(ii) 2, barely visible floccules;
(iii) 6, floccules of intermediate size;
(iv) 8, good floccules; and
(v) 10, very good floccules.

During decantation, its speed was noted and the turbidity of the supernatant was determined.

In all of the experiments, the water soluble gum/polymer was used in the form of the adjuvant compositions of the invention and improvements in the dispersion and dissolution of the gum were noted. In addition to this advantage, which is highly important from an industrial standpoint, most often improvements in the speed of flocculation, decantation and improved turbidity resulted.

EXAMPLES 1 to 4

Experiments A to D

Examples 1 to 4 illustrate the use of aluminum sulfate as the flocculating agent and the following compositions as flocculating adjuvants, which contained:

(i) Water soluble gum:
 Xanthan gum;
 Sodium alginate;
 Polymer A;
(ii) Water donor: a precipitated silica;
(iii) Anionic surfactant: sodium diisopropylnaphthalene sulfonate (D.N.S.S.);
(iv) Water.

Experiments A to D were control experiments in which the flocculating agent was identical and the flocculating adjuvant consisted only of the water soluble gum alone. The results of these Examples and Experiments are reported in Table I.

TABLE I

Treatment of crude water having a temperature of 12° C. and a turbidity of 5

| EXAMPLES | FLOCCULATING AGENT Nature | $cm^3/m^3$ | FLOCCULATING ADJUVANT Nature | $g/m^3$ | FLOCCULE SIZE 5 mn | 10 mn | DECANTATION | TURBIDITY NTU |
|---|---|---|---|---|---|---|---|---|
| A | Aluminum sulfate | 50 | Xanthan gum | 0.5 | <6 | ≧6 | Good | 0.9 |
| 1 | Aluminum sulfate | 50 | Xanthan gum = 60 silica = 11.65 D.N.S.S. = 5 water = 23.35 | 0.5 | ≃6 | >6 | Good | 1 |
| B | Aluminum sulfate | 50 | Sodium alginate | 0.5 | 6 | >6 | Good | 1.2 |
| 2 | Aluminum sulfate | 50 | Sodium alginate = 60 silica = 8.75 D.N.S.S. = 5 water = 26.25 | 0.5 | ≃6 | ≧6 | Good | 1.2 |
| C | Aluminum sulfate | 50 | Polymer A | 0.5 | 8 | 8 | Very good | 1.2 |
| 3 | Aluminum sulfate | 50 | Polymer A = 60 silica = 11.65 D.N.S.S. = 5 water = 23.35 | 0.5 | 8 | 8 | Very good | 0.8 |
| D | Aluminum sulfate | 50 | Polymer A | 0.2 | ≃8 | ≃8 | Very good | 0.65 |
| 4 | Aluminum sulfate | 50 | Polymer A = 60 silica = 11.65 D.N.S.S. = 5 water = 23.35 | 0.2 | ≃8 | ≃8 | Very good | 0.45 |

The agitators were next removed and the water was decanted for 20 minutes.

The provision of the gums in the form of the adjuvant compositions of the invention markedly facilitates the dispersion and dissolution thereof. Such also provides the following advantages:

The results of these Examples and Experiments are reported in Table II.

TABLE II

| | Treatment of crude water having a temperature of 15° C. and a turbidity of 6.2 | | | | | | | |
|---|---|---|---|---|---|---|---|---|
| | FLOCCULATING AGENT | | FLOCCULATING ADJUVANT | | FLOCCULE SIZE | | | TURBIDITY |
| EXAMPLES | Nature | cm³/m³ | Nature | g/m³ | 5 mn | 10 mn | DECANTATION | NTU |
| E | Aluminum sulfate | 50 | Xanthan gum | 0.42 | <6 | ≧6 | Rather good | 0.9 |
| 5 | Aluminum sulfate | 50 | Xanthan gum = 60<br>silica = 11.65<br>D.N.S.S. = 5<br>water = 23.35 | 0.42 | >6 | >6 | Good | 0.65 |
| 6 | Aluminum sulfate | 50 | Xanthan gum = 60<br>Na₂SO₄.10H₂O = 11.65<br>D.N.S.S. = 5<br>water = 23.35 | 0.42 | >6 | >6 | Good | 0.75 |
| F | Aluminum sulfate | 50 | Sodium alginate | 0.42 | <6 | ≧6 | Rather good | 0.85 |
| 7 | Aluminum sulfate | 50 | Sodium alginate = 60<br>silica = 8.75<br>D.N.S.S. = 5<br>water = 26.25 | 0.42 | >6 | >6 | Good | 0.75 |
| 8 | Aluminum sulfate | 50 | Sodium alginate = 60<br>Na₂SO₄.10H₂O = 8.75<br>D.N.S.S. = 5<br>water = 26.25 | 0.42 | ≧6 | ≧6 | Good | 0.80 |
| G | Aluminum sulfate | 50 | Polymer A | 0.18 | >6 | ≦8 | Good | 0.9 |
| 9 | Aluminum sulfate | 50 | Polymer A = 60<br>silica = 11.65<br>D.N.S.S. = 5<br>water = 23.35 | 0.18 | <8 | <8 | Very good | 0.60 |
| 10 | Aluminum sulfate | 50 | Polymer A = 60<br>Na₂SO₄.10H₂O = 11.65<br>D.N.S.S. = 5<br>water = 23.35 | 0.18 | ≈6 | 6 | Good | 0.80 |

(i) Flocculation was slightly more rapid in the case of Xanthan gum;

(ii) Flocculation was better in the case of sodium alginate; and (iii) The turbidity was better in the case of polymer A, and the results obtained was excellent with but very small quantities of said polymer A.

EXAMPLES 5 to 10

Experiments E to G

Examples 5, 7, 9 and Experiments E, F and G were identical to those preceding, except that different amounts were used.

In contrast, in Examples 6, 8 and 10 a different water donor was employed in the adjuvants according to the invention, i.e., sodium sulfate decahydrate was utilized.

In addition to the advantages of the use of the adjuvant compositions of the invention, at the onset an acceleration in flocculation, and improvements in decantation and turbidity were noted. It will be seen from Table II that the results are slightly diminished if silica is replaced by a hydrated salt in the adjuvant compositions of the invention, but they are still much better than those of the control experiments.

EXAMPLES 11 to 16

Experiments H to J

In these Examples and Experiments the nature of the flocculating agent was changed; it was ferric chlorosulfate.

The results are reported in Table III.

TABLE III

| | Treatment of crude water having a temperature of 15° C. and a turbidity of 6.2 | | | | | | | | |
|---|---|---|---|---|---|---|---|---|---|
| EXAM- | FLOCCULATING AGENT | | FLOCCULATING ADJUVANT | | FLOCCULE SIZE | | | TURBIDITY NTU | |
| PLES | Nature | cm³/m³ | Nature | g/m³ | 5 mn | 10 mn | DECANTATION | 20 mn | 120 mn |
| H | Ferric chlorosulfate | 30 | Xanthan gum | 0.5 | >6 | >6 | Good | 1.0 | |
| 11 | Ferric chlorosulfate | 30 | Xanthan gum = 60<br>silica = 11.65<br>D.N.S.S. = 5<br>water = 23.35 | 0.42 | >6 | >6 | Good | 1.6 | 1.0 |
| 12 | Ferric chlorosulfate | 30 | Xanthan gum = 60<br>Na₂SO₄.10H₂O = 11.65<br>D.N.S.S. = 5<br>water = 23.35 | 0.42 | >6 | >6 | Good | 1.7 | 1.1 |
| I | Ferric chlorosulfate | 30 | Sodium alginate | 0.5 | ≧6 | >6 | Rather good | 1.3 | |
| 13 | Ferric | 30 | Sodium alginate = 60 | 0.42 | >6 | >6 | Good | 1.8 | 1.0 |

TABLE III-continued

Treatment of crude water having a temperature of 15° C. and a turbidity of 6.2

| EXAM-PLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU 20 mn | 120 mn |
|---|---|---|---|---|---|---|---|---|---|
| | chlorosulfate | | silica = 8.75<br>D.N.S.S. = 5<br>water = 26.25 | | | | | | |
| 14 | Ferric chlorosulfate | 30 | Sodium alginate = 60<br>Na₂SO₄.10H₂O = 8.75<br>D.N.S.S. = 5<br>water = 26.25 | 0.42 | >6 | >6 | Good | 2.0 | 1.0 |
| J | Ferric chlorosulfate | 30 | Polymer A | 0.20 | 8 | 8 | Good | 1.5 | 0.9 |
| 15 | Ferric chlorosulfate | 30 | Polymer A = 60<br>silica = 11.65<br>D.N.S.S. = 5<br>water = 23.35 | 0.18 | ≃8 | ≃8 | Good | 1.6 | 0.9 |
| 16 | Ferric chlorosulfate | 30 | Polymer A = 60<br>Na₂SO₄.10H₂O = 11.65<br>D.N.S.S. = 5<br>water = 23.35 | 0.18 | >6 | >6 | Good | 1.7 | 1.0 |

Thus, for identical results of flocculation and decantation, lesser amounts of the water soluble gums and polymers may be used, when same are formulated as the compositions of the invention.

EXAMPLES 17 to 20

Experiments K to N

The following Examples and Experiments illustrate the use of other natural gums: gum tragacanth, pectin (L.M.) and gelatin, as well as another synthetic polymer: polymer C.

The flocculating agent was aluminum sulfate.

The results are reported in Tables IV and V.

It will be seen that the compositions containing pectin afforded better initial flocculation. Improved flocculation was also noted for the case of polymer C and gelatin. In the case of the latter, improved turbidity was also noted.

EXAMPLES 21 to 26

In the series of examples which follow, the amount of the water soluble gum, i.e., Xanthan gum, contained in the various compositions used as flocculating adjuvants, was varied. The flocculating agent was aluminum sulfate.

The results are reported in Table VI.

TABLE IV

Treatment of crude water having a temperature of 14° C. and a turbidity of 8.4

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| K | Aluminum sulfate | 50 | Gum tragacanth | 5 | >6 | ≃8 | Good | 0.55 |
| 17 | Aluminum sulfate | 50 | Gum tragacanth = 60<br>silica = 11.65<br>D.N.S.S. = 5<br>water = 23.35 | 5 | >6 | ≃8 | Good | 0.53 |
| L | Aluminum sulfate | 50 | Pectin (L.M.) | 2 | 6 | >6 | Rather good | 1 |
| 18 | Aluminum sulfate | 50 | Pectin (L.M.) = 60<br>silica = 11.65<br>D.N.S.S. = 5<br>water = 23.35 | 2 | ≧6 | >6 | Rather good | 1 |
| M | Aluminum sulfate | 50 | Polymer C | 0.5 | ≧6 | >6 | Mediocre | 1.4 |
| 19 | Aluminum sulfate | 50 | Polymer = 60<br>silica = 11.65<br>D.N.S.S. = 5<br>water = 23.35 | 0.5 | >6 | ≃8 | Mediocre | 1.4 |

TABLE V

Treatment of crude water having a temperature of 19° C. and a turbidity of 5

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| N | Aluminum sulfate | 50 | Gelatin | 2 | ≦6 | 6 | Rather good | 1.3 |
| 20 | Aluminum sulfate | 50 | Gelatin = 60<br>silica = 11.65<br>D.N.S.S. = 5<br>water = 23.35 | 2 | 6 | >6 | Rather good | 1.1 |

TABLE VI

Treatment of crude water having a temperature of 20° C. and a turbidity of 7.2

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| 21 | Aluminum sulfate | 50 | Xanthan gum = 40<br>silica = 18.35<br>D.N.S.S. = 5<br>water = 36.65 | 0.5 | ≧6 | >6 | Good | 0.70 |
| 22 | Aluminum sulfate | 50 | Xanthan gum = 50<br>silica = 11.25<br>D.N.S.S. = 5<br>water = 33.75 | 0.5 | <6 | 6 | Rather good; slight suspension | 1.1 |
| 23 | Aluminum sulfate | 50 | Xanthan gum = 50<br>silica = 15<br>D.N.S.S. = 5<br>water = 30 | 0.5 | ≧6 | >6 | Good | 0.70 |
| 24 | Aluminum sulfate | 50 | Xanthan gum = 60<br>silica = 8.75<br>D.N.S.S. = 5<br>water = 26.25 | 0.5 | ≧6 | >6 | Good | 0.75 |
| 25 | Aluminum sulfate | 50 | Xanthan gum = 60<br>silica = 11.65<br>D.N.S.S. = 5<br>water = 23.35 | 0.5 | ≧6 | >6 | Good | 0.65 |
| 26 | Aluminum sulfate | 50 | Xanthan gum = 70<br>silica = 8.35<br>D.N.S.S. = 5<br>water = 16.65 | 0.5 | ≧6 | >6 | Good | 0.70 |

Thus, it will be seen from the foregoing Table that similar results relative to flocculation, decantation and turbidity were obtained with compositions containing lesser amounts of Xanthan gum.

EXAMPLES 27 to 32

The preceding Examples were repeated, but the aluminum sulfate was replaced by ferric chlorosulfate. The results are reported in Table VII.

EXAMPLES 33 to 36

Experiments O to P

In the following two series of examples, two aluminum sulfate and ferric chlorosulfate flocculating agents combined with flocculating adjuvants consisting of a synthetic gum, polymer A, and, as the water donor, an organic salt hydrate, sodium acetate trihydrate, or calcium lactate pentahydrate, were used.

TABLE VII

Treatment of crude water having a temperature of 20° C. and a turbidity of 7.2

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| 27 | Ferric chlorosulfate | 30 | Xanthan gum = 40<br>silica = 18.35<br>D.N.S.S. = 5<br>water = 36.65 | 30 | ≈8 | ≈8 | Good | 1.2 |
| 28 | Ferric chlorosulfate | 30 | Xanthan gum = 50<br>silica = 11.25<br>D.N.S.S. = 5<br>water = 33.75 | 30 | ≈8 | ≈8 | Good; slight suspension | 1.9 |
| 29 | Ferric chlorosulfate | 30 | Xanthan gum = 50<br>silica = 15<br>D.N.S.S. = 5<br>water = 30 | 30 | ≈8 | ≈8 | Good | 1.1 |
| 30 | Ferric chlorosulfate | 30 | Xanthan gum = 60<br>silica = 8.75<br>D.N.S.S. = 5<br>water = 26.25 | 30 | ≈8 | ≈8 | Good | 1.3 |
| 31 | Ferric chlorosulfate | 30 | Xanthan gum = 60<br>silica = 11.65<br>D.N.S.S. = 5<br>water = 23.35 | 30 | ≈8 | ≈8 | Good | 1.2 |
| 32 | Ferric chlorosulfate | 30 | Xanthan gum = 70<br>silica = 8.35<br>D.N.S.S. = 5<br>water = 16.65 | 30 | ≈8 | ≈8 | Good | 1.2 |

From the foregoing Table, it will be seen that there is no advantage in using large amounts of Xanthan gum in the compositions used as flocculating adjuvants.

Two control experiments in which the flocculating adjuvant consisted only of a water soluble synthetic polymer were also carried out.

The results are reported in Table VIII.

TABLE VIII

Treatment of crude water having a temperature of 20° C. and a turbidity of 7.2

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| O | Aluminum sulfate | 50 | Polymer A | 0.1 | ≧6 | >6 | Good; slight suspension | 0.9 |
| 33 | Aluminum sulfate | 50 | Polymer A = 60 NaC₂H₃O₂.3H₂O = 40 | 0.1 | >6 | >6 | Good; slight suspension | 0.85 |
| 34 | Aluminum sulfate | 50 | Polymer A = 60 Ca(C₃H₅O₃)₂.5H₂O = 40 | 0.1 | >6 | >6 | Good | 0.70 |
| P | Ferric chlorosulfate | 25 | Polymer A | 0.1 | ≧6 | >6 | Rather good | 1.8 |
| 35 | Ferric chlorosulfate | 25 | Polymer A = 60 NaC₂H₃O₂.3H₂O = 40 | 0.1 | ≧6 | >6 | Rather good | 1.7 |
| 36 | Ferric chlorosulfate | 25 | Polymer A = 60 Ca(C₃H₅O₃)₂.5H₂O = 40 | 0.1 | ≧6 | >6 | Good | 1.5 |

In the examples of the invention, as reflected in the previous Table, the turbidity was improved.

EXAMPLES 37 and 38

The two examples hereinafter illustrate the use of flocculating adjuvants consisting of Xanthan gum combined with sodium acetate trihydrate or calcium lactate pentahydrate; the flocculating agent was ferric chlorosulfate.

The results are reported in Table IX.

TABLE IX

Treatment of crude water having a temperature of 20° C. and a turbidity of 7.2

| EXAMPLES | FLOCCULATING AGENT Nature | cm³/m³ | FLOCCULATING ADJUVANT Nature | g/m³ | FLOCCULE SIZE 5 mn | 10 mn | DECANTATION | TURBIDITY NTU |
|---|---|---|---|---|---|---|---|---|
| 37 | Ferric chlorosulfate | 25 | Xanthan gum = 60 NaC₂H₃O₂.3H₂O = 40 | 0.3 | >6 | <8 | Good | 1.2 |
| 38 | Ferric chlorosulfate | 25 | Xanthan gum = 60 Ca(C₃H₅O₃)₂.5H₂O = 40 | 0.3 | >6 | <8 | Good | 1.1 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the treatment/purification of an aqueous medium by flocculation, the improvement which comprises, utilizing as a flocculant adjuvent therefor, that composition of matter adapted for ready dispersion/dissolution in said aqueous medium comprising intimate admixture of a water soluble gum, polymer or biogum heteropolysaccharide, and a dispersion/dissolution enhancing amount of a water donor material and water associated with said water donor said flocculant adjuvent comprising from 30 to 70% by weight of the water soluble gum, polymer or biogum heteropolysaccharide; from 7 to 40% by weight of the water donor; and from 15 to 37% by weight of water associated with said water donor.

2. In a process for the treatment/purification of an aqueous medium by flocculation which comprises treating/purifying said aqueous medium at a pH ranging from 6 to 9 with an iron or aluminum flocculating agent, or mixture thereof, the improvement which comprises thence treating/purifying said aqueous medium with that flocculating adjuvant adapted for ready dispersion/dissolution in said aqueous medium comprising intimate admixture of a water soluble gum, polymer or biogum heteropolysaccharide, a water donor material and water associated with said water donor material, the weight of said gum polymer or biogum heteropolysaccharide being from 6.5 to 1 times the weight of said water and the weight of said water donor material being from 0.3 to 2.6 times the weight of said water.

3. The process as defined by claim 2, said flocculating adjuvant comprising a water soluble biogum heteropolysacharide and said biogum heteropolysaccharide comprising product of fermentation of a carbohydrate with bacteria of the genera Xanthomonas or Arthrobacter, or with fungi of the genus Sclerotium.

4. The process as defined by claim 3, said biogum heteropolysaccharide comprising product of fermentation of a carbohydrate with *Xanthomonas begoniae, Xanthomonas campestris, Xanthomonas carotea, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians, Xanthomonas pelargonii, Arthrobacter stabilis, Arthrobacter viscosus, Sclerotium glucanicum* or *Sclerotium rolfsii.*

5. The process as defined by claim 4, said biogum heteropolysaccharide comprising product of fermentation of a carbohydrate with *Xanthomonas beqoniae, Xanthomonas campestris, Xanthomonas incanae* or *Xanthomonas pisi.*

6. The process as defined by claim 5, said biogum heteropolysaccharide comprising product of fermentation of a carbohydrate with *Xanthomonas campestris.*

7. The process as defined by claim 3, said biogum heteropolysaccharide comprising a Xanthan gum.

8. The process as defined by claim 2, said flocculating adjuvant comprising a water soluble natural gum.

9. The process as defined by claim 8, said natural gum comprising agar-agar, an alginate, a carrageenate, gum arabic, gum tragacanth, carob gum, guar gum, pectin, gelatin, or mixture thereof.

10. The process as defined by claim 9, said natural gum comprising sodium alginate, gum tragacanth, pectin, gelatin, or mixture thereof.

11. The process as defined by claim 2, said flocculating adjuvant comprising a water soluble synthetic polymer.

12. The process as defined by claim 11, said synthetic polymer comprising a polyacrylic or polymethacrylic acid, or salt or ester thereof, a polyacrylamide or polymethacrylamide, or water soluble derivative thereof.

13. The process as defined by claim 11, said synthetic polymer comprising at least one polymer or copolymer of acrylamide, methacrylamide, acrylic acid or methacrylic acid, or salt or ester thereof, or optionally quaternized aminoalkyl acrylate or methacrylate.

14. The process as defined by claim 2, the water donor material which comprises said flocculating adjuvant comprising a finely divided silica, a hydrated silica gel, a dehydrated silica gel, an alumina hydrate, an argilla, a natural or synthetic zeolite, or a hydrate of an inorganic or organic salt.

15. The process as defined by claim 14, said water donor comprising a hydrate of at least one sodium, potassium, calcium or magnesium carbonate, halide, nitrate, phosphate, silicate, sulfate, acetate, citrate, lactate, laurate or tartrate, or mixture thereof.

16. The process as defined by claim 14, said water donor comprising a finely divided silica having a BET surface of 200 to 400 $m^2/g$ and a particle diameter ranging from 200 to 800 Å, sodium acetate trihydrate or calcium lactate pentahydrate.

17. The process as defined by claim 2; the water donor material which comprises said flocculating adjuvant comprising bound water.

18. The process as defined by claim 2, the water donor material which comprises said flocculating adjuvant comprising water of crystallization.

19. The process as defined by claim 2, the water donor material which comprises said flocculating adjuvant comprising sorbed water.

20. The process as defined by claim 2, the water donor material which comprises said flocculating adjuvant being adapted to sorb and retain water from said aqueous medium.

21. The process as defined by claim 2, said flocculating adjuvant comprising a free-flowing powder.

22. The process as defined by claim 2, said flocculating agent comprising aluminum sulfate, aluminum chloride, aluminum hydroxychloride, ferric chloride or ferric chlorosulfate.

23. The process as defined by claim 2, the aqueous medium subjected to flocculation being in a state of agitation.

24. The process as defined by claim 2, the aqueous medium subjected to flocculation being a potable water.

25. The process as defined by claim 2, the aqueous medium being treated/purified with such amount of flocculating adjuvant as to provide from 0.05 to 1 g of the water soluble gum, polymer or biogum heteropolysaccharide per cubic meter of said aqueous medium.

26. In a process for the treatment/purification of an aqueous medium by flocculation which comprises treating/purifying said aqueous medium at a pH ranging from 6 to 9 with an iron or aluminum flocculating agent, or mixture thereof, the improvement which comprises thence treating/purifying said aqueous medium with that flocculating adjuvant adapted for ready dispersion/dissolution in said aqueous medium comprising intimate admixture of from 30% to 70% by weight of a water soluble gum, polymer or biogum heteropolysaccharide; from 7 to 40% by weight of a water donor; from 0 to 10% by weight of an anionic or nonionic surfactant, or mixture thereof; and from 15 to 37% by weight of water associated with said water donor.

27. The process as defined by claim 26 said flocculating adjuvant comprising a free-flowing powder.

28. The process as defined by claim 27, said flocculating adjuvant comprising from 50 to 60% by weight of the water soluble gum, polymer or biogum heteropolysaccharide; from 8 to 15% by weight of the water donor; up to 7% by weight of the surfactant; and from 24 to 36% by weight of water associated with said water donor.

29. The process as defined by claim 26, said surfactant comprising an alkali metal soap, an alkali sulfonate, a sulfate or sulfated compound, an alkaline phosphate, a polyalkylene alkylphenol, an aliphatic polyoxyalkylene alcohol, a fatty amide, or a polyoxyethylene or polyoxypropylene compound, or mixture thereof.

30. The process as defined by claim 29, said surfactant comprising sodium diisopropylnaphthalene sulfonate.

31. In a process for the treatment/purification of an aqueous medium by flocculation, the improvement which comprises utilizing as a flocculant adjuvant therefor, that composition of matter adapted for ready dispersion/dissolution in said aqueous medium comprising (i) intimate admixture of a water soluble biogum heteropolysaccharide comprising product of fermentation of a carbohydrate with bacteria of the genera Xanthomonoas or Arthrobacter, or with fungi of the genus Sclerotium (ii) a water donor material comprising a finely divided silica, a hydrated silica gel, a dehydrated silica gel, an alumina hydrate, an argilla, a natural or synthetic zeolite, or a hydrate of an inorganic salt and (iii) water associated with said water donor material, the weight of said biogum being from 6.5 to 1 times the weight of said water and the weight of water donor material being from 0.3 to 2.6 times the weight of said water.

32. In a process for the treatment/purification of an aqueous medium by flocculation which comprises treating/purifying said aqueous medium at a pH ranging from 6 to 9 with an iron or aluminum flocculating agent, or mixture thereof, the improvement which comprises thence treatment/purifying said aqueous medium with that flocculant adjuvant adapted for ready dispersion/dissolution in said aqueous medium comprising (i) intimate admixture of a water soluble biogum heteropolysaccharide comprising product of fermentation of a carbohydrate with bacteria of the genera Xanthomanas or Arthrobacter, or with fungi of the genus Sclerotium, (ii) a water donor material which comprises said floccu-lating adjuvent comprising a finely divided silica, a hydrated silica gel, a dehydrated silica gel, an alumina hydrate, an argilla, a natural or synthetic zeolite, or a hydrate of an inorganic or organic salt, and (iii) water associated with said water donor material, the weight of said biogum being from 6.5 to 1 times the weight of said water and the weight of said water donor material being from 0.3 to 2.6 times the weight of said water.

33. In a process for the treatment/purification of an aqueous medium by flocculation which comprises treating/purifying said aqueous medium at a pH ranging from 6 to 9 with an iron or aluminum flocculating agent, or mixture thereof, the improvement which comprises thence treating/purifying said aqueous medium with that flocculating adjuvent adapted for ready dispersion/dissolution in said aqueous medium comprising intimate admixture of from 30% to 70% by weight of a water soluble biogum heteropolysaccharide comprising product of fermentation of a carbohydrate with bacteria of the genera Xanthomonas or Anthrobacter, or with fungi of the genus Sclerotium; from 7 to 40% by weight of water donor material comprising a finely divided silica, a hydrated silica gel, a dehydrated silica gel, an alumina hydrate, an argilla, a natural or synthetic zeolite, or a hydrate of an inorganic or organic salt; from 0 to 10% by weight of an anionic or nonionic surfactant, or mixture thereof; and from 15 to 37% by weight of water associated with said water donor.

* * * * *